United States Patent [19]

Imura et al.

[11] Patent Number: 4,664,515

[45] Date of Patent: May 12, 1987

[54] OPTICAL SYSTEM OF A RADIATION THERMOMETER

[75] Inventors: Kenji Imura, Osaka; Tetsuyuki Tanimoto, Sakai, both of Japan

[73] Assignee: Minolta Camera Kabushiki Kaisha, Osaka, Japan

[21] Appl. No.: 632,812

[22] Filed: Jul. 20, 1984

[30] Foreign Application Priority Data

Jul. 26, 1983 [JP] Japan ................................. 58-137364

[51] Int. Cl.[4] .............................................. G01J 5/48
[52] U.S. Cl. ...................................... 356/43; 350/444; 374/130
[58] Field of Search ................... 356/43; 350/620, 444, 350/540, 541, 1.7; 374/130, 131

[56] References Cited

U.S. PATENT DOCUMENTS

| 778,694 | 12/1904 | Mustin | 350/540 |
|---|---|---|---|
| 2,761,072 | 8/1956 | Wormser | 356/43 |
| 2,869,369 | 1/1959 | Howell | 374/130 |
| 3,064,526 | 11/1962 | Lindsay | 350/620 |

*Primary Examiner*—R. A. Rosenberger
*Attorney, Agent, or Firm*—Price, Gess & Ubell

[57] ABSTRACT

The present invention relates to an optical system of a radiation thermometer in which the measuring optical system and the finder optical system can be focused. The central portion of the sub-mirror in Cassegrainian type optical system is used as a finder lens of the finder optical system. The third mirror is located between the main and sub-mirrors in order to reflect the light passed through the central portion of the sub-mirror. The light reflected on the third mirror is used for finder observation.

16 Claims, 9 Drawing Figures

PRIOR ART

OPTICAL SYSTEM OF A RADIATION THERMOMETER

BACKGROUND OF THE INVENTION

1. Field of the Invention

The present invention relates to a radiation thermometer for measuring temperature of a target object, and more particularly it relates to an optical system for such a radiation thermometer including a viewfinder for sighting the thermometer such that its optical system for the measurement (hereinafter referred to as a measuring optical system) is correctly aimed at and focused on a target object to be measured.

2. Description of the Prior Art

Various kinds or types have been known for the aforementioned optical system, and most of them employ a single lens reflex type viewfinder of which the optical axis coincides with the optical axis of the measuring optical axis and with which parallax does not occur between the measuring and viewfinder optical systems. FIG. 1(a) shows an exemplary one of the conventional optical systems for a radiation thermometer for measuring temperature of the range not less than 100° C. With reference to FIG. 1(a), the light from a target object to be measured passes through the off-axis portion of a lens L1 and is focused on a photoelectric detector 2 of which the output is processed to present the temperature of the target object. The light beam having passed through the central portion of the lens L1 is reflected by a mirror 4 and directed out of the measuring light path area to form an image of the target object through or by means of a viewfinder optical system including a mirror 6, a focusing plate 8 and an eyepiece 10. The lens L1 can move along the optical axis for the focusing. Hence, the viewfinder enables the observation of the image of the target object being measured by the radiation thermometer and of the focusing condition of its optical system. FIG. 1(b) shows another optical system wherein a beam splitting mirror 12 consisting of a dichroic mirror or a half-mirror is used instead of the mirror 4 in FIG. 1(a). Those constructions require less components and are simple. However, in order to enable measurement of the temperature to the ordinary temperature range with those constructions, the lens L1 must be made of a material that is transparent to the light of the long wavelength range of 8–14 μm as well as of the visible light wavelength range. Diamond has such an optical property but is very expensive. Nacl having also such a property is unstable both physically and chemically.

Accordingly, for the optical system of the radiation thermometer, one may think of a combination of a measuring optical system of the Cassegrainian type and a viewfinder, as shown in FIG. 2a and 2b. With reference to FIG. 2a, the light to be measured is reflected at the peripheral portion of the main mirror 14 of a Cassegrainian type optical system and then at the peripheral portion of a submirror 16, and passes through the aperture 14a of the main mirror 14 to impinge on the photoelectric detector 2. On the other hand, the paraxial light beam traveling in the Cassegrainian type optical system is reflected by mirrors 18 and 20 respectively and is introduced through a viewfinder lens $L_F$, a focusing plate 8 and eyepiece 10 to the eye of the user or observer enabling the observation of the object image. FIG. 2(b) show a modification wherein the viewfinder lens $L_F$ is disposed in front of the mirror 18 with its optical axis coinciding with the optical axis of the Cassegrainian type optical system, the mirror 20 of FIG. 2(a) was substituted by a pentagonal prism 22 for inverting the image, and further a condenser lens 24 is interposed between the focusing plate 8 and the eyepiece 10. In front of the photoelectric detector 2 is disposed a pin-hole plate 26 for restricting the Width of the light beam incident on the detector 2. The constructions as shown in FIGS. 2(a) and 2(b) dispenses with the lens in the measuring optical system and accordingly does not require the expensive material or the physically and chemically unstable material so that they will not be expensive nor physically and chemically unstable. However, they will be cumbersome and lose compactness since the mirror 18 must be disposed in front of the submirror 16. Additionally, in the case of the example shown in FIG. 2(a), since the viewfinder lens $L_F$ is distant from the mirror 18, the viewfinder image will not be observed if the user shifts his or her eye by a little amount. The example shown in FIG. 2(b) is free from this disadvantage but is more cumbersome because not only the mirror 18 but also the viewfinder lens $L_F$ are disposed in front of the submirror.

SUMMARY OF THE INVENTION

An object of the present invention is to provide a compact and inexpensive optical system for a radiation thermometer for measuring temperature of a range including the ordinary temperature range and which system includes a single lens reflex type viewfinder.

Another object of the present invention is to provide such an optical system for the radiation thermometer as mentioned above and in which a simple construction enables the simultaneous focus adjustment of both the measuring and viewfinder optical system.

To attain the above objects, the present invention is characterized by that the central portion of the submirror of the Cassegrainian type optical system is made use of as a viewfinder lens and a mirror is located in the space at the rear of the submirror to direct the viewfinder light out of the measuring light path area, in view of the fact that the submirror of the Cassegrainian type optical system is used for the introduction of the measuring light only at its peripheral or off-axis portion but its central portion is not used for the measurement and that the submirror itself is composed of a lens with a light reflecting layer being formed on its back surface as shown in FIGS. 2(a) and 2(b), and further that a space is necessarily formed about the optical axis between the main and sub-mirrors and at the back of the submirror to direct the viewfinder light out of the measuring light path.

DETAILED DESCRIPTION OF THE PREFERRED EMBODIMENT

Figure 3:
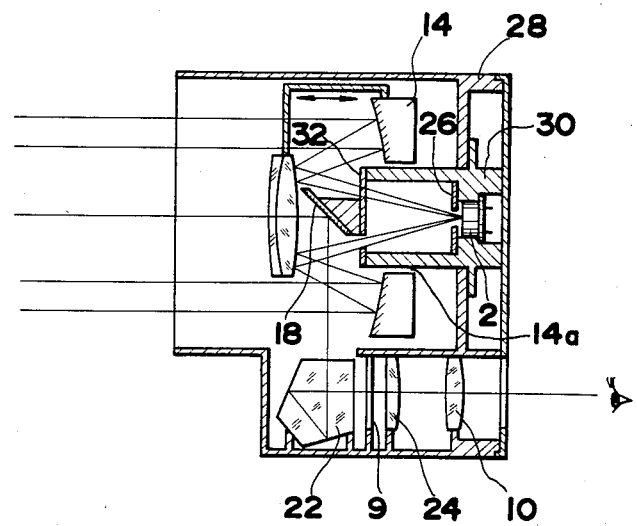
FIG. 3 is a cross sectional view showing an optical system for a radiation thermometer according to an embodiment of the present invention.

Explanation will now be made about an embodiment of the present invention with reference to the drawings. In FIG. 3 showing the optical system of the embodiment of the present invention, the same reference numerals are used for the elements that are similar or correspond to the elements in FIGS. 1a, 1b, 2a and 3b. The explanation of such elements will be made only briefly hereinafter.

Figure 4:
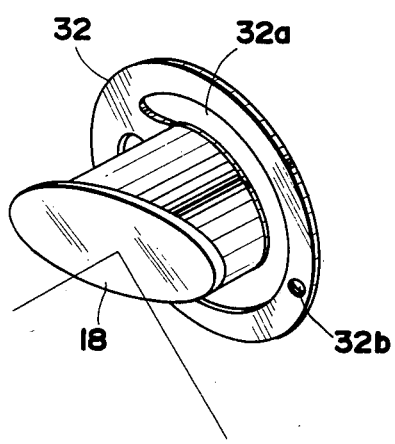
FIG. 4 is a perspective view showing the structure of the mass plate 32 in the embodiment.

With reference to FIG. 3, the reference numeral 28 designates a main body to which a light restricting sleeve 30 is attached with its position having been adjusted as described later. A photoelectric detector 2 is fixed within the sleeve 30. The sleeve 30 extends through forward along the optical axis the central aperture 14a of the main mirror 14 to block the light that otherwise will cause the noise in the light measurement. A pinhole plate 26 is fixed within the light blocking sleeve 30 to restrict the width of the light beam that will impinge on the plotoelectric detector 2. A mask plate 32 of an elastic material is attached to the end of the light restricting sleeve 30 such that the position of the plate 32 can be adjusted. A mirror 18 is supported at the center of the mask plate 32 integrally therewith. The mask plate 32 supports a mirror 18 at its center as shown in FIG. 4 such that the mirror 18 inclines at the angle of 45°. The mask plate 32 is formed with a circular slot 32a, at its periphery portion and with a hole 32b radially outside of the slot 32a. The hole 32b permits passage of a screw which fixes the mask plate 32 in order to fix the mask plate 32 to the sleeve 30.

According to the present embodiment, the submirror 16 is a compound lens consisting of a negative lens and a positive lens which are cemented with each other, with a light reflective layer 16a being formed only on the peripheral portion of the last, i.e., the rearmost surface of the lenses. The central portion 16b of the lenses serves as a viewfinder lens $L_F$ likely as in the conventional optical system. Hence, the light from a target object to be measured is reflected by the main mirror 14 and is then reflected by the reflective layer at the peripheral portion 16a of the submirror 16 and passes through the circular slot 32a of the mask plate and through the pinhole of pinhole plate 2b to impinge on the photoelectric detector 2. The position and the size of the mirror 18 are determined such that the mirror 18 lies within the space between the main mirror 14 and submirror 16 and interior of the ring-shaped (in cross section) light beam reflected by the submirror, i.e., within the space formed at the back of and close to the submirror 16 and about the optical axis of the Cassegrainian type optical system.

Figure 5:
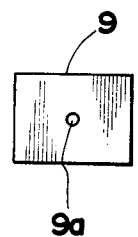
FIG. 5 is a front elevational view of the focusing plate 18 of the embodiment.

The light beam that has passed through the viewfinder lens portion 16b i.e. the central portion of the submirror lens 16, is reflected by the mirror 18 and directed to the outside of the measuring light path, crossing the path. The light beam is introduced through the pentagonal prism 22, the focusing plate 9, the condenser lens 24 and the eyepiece 10 to the eye of the user to enable the observation of the target object. As shown in FIG. 5, the focusing plate 9 has an indexing mark 9a at the center for indicating in the viewfinder field, the area or region of the target object to be measured. In the present invention, the mirror 18 and the pentagonal prism 22 are fixed on the main body 28 along with the focusing plate 9 and the condenser lens 24. The focusing may be adjusted by integrally moving the main mirror 14 and the submirror 16 along the optical axis as indicated by the arrow in FIG. 3. It should be noted that the optical system must be designed such that the Cassegrainian type measuring optical system including the main mirror 14 and submirror 16 and the viewfinder optical system composed of the viewfinder lens portion 16b of the submirror 16, the mirror 18, the pentagonal prism 22, the focusing plate 9, the condenser lens 24 and the eyepiece 10 are always focused on the same object. In other words, the amount of change in the focusing distance for a certain amount of the movement of the focusing element in the measuring optical system must be equal to the amount of change in the focusing distance for said certain amount of the movement of the focusing element in the viewfinder optical system. The present embodiment is designed such that the compound focal length of the measuring optical system composed of the main mirror 14 and the reflective portion 16a of the submirror 16 is equal to the focal length of the lens at the central portion 16b of the submirror 16. It should be noted that the width of the light rays incident on the photoelectric detector 2 will not change in accordance with the focus adjustment of the measuring optical system because the mask plate 32 and the pinhole plate 26 are fixed on the main body 28.

Further, the relative position of the measuring and viewfinder optical system must be adjusted such that the optical axis of the Cassegrainian type measuring optical system exactly coincides with the optical axis of the viewfinder optical system and the pinhole of the pinhole plate 26 is at a position optically equivalent to the position of indexing mark 9a to enable the observation of the area of the target object at the center of the viewfinder field through the viewfinder optical system, i.e. to enable the exact identification of the measured region of the object. The construction for that purpose will be described herein after.

Figure 6:
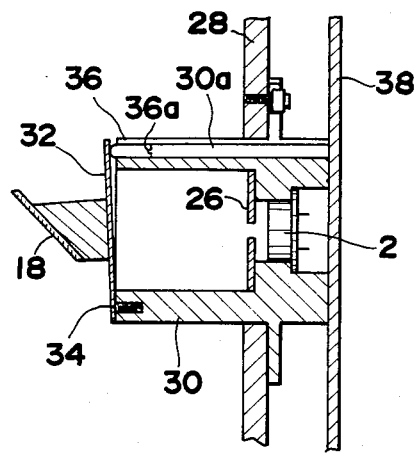
FIG. 6 is an enlarged sectional view showing the structure of the light restricting sleeve or hood 30 and its surroundings.
Figure 7:
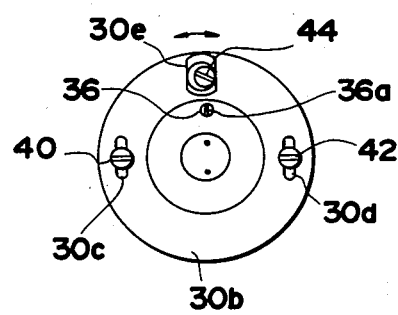
FIG. 7 is a front elevational view of the adjusting mechanism for the mirror 18.

With reference to FIG. 6 showing a mechanism for such adjustment, a mask plate 32 which integrally supports the mirror 18, is supported by the light restricting sleeve 30 by means of a screw 34 which extends through the screw hole 32a of the mask plate 32 and is fixed on the end surface of the sleeve 30. At the position diametrically opposite to the screw 34, the mask plate 32 is engaged by the tip of an adjusting screw 36 which is projected from in the end portion of the through hole 30a extending within the side wall of the light restricting sleeve 30 in the direction of the optical axis. A minus driver tip receiving groove 36a is formed at the end of the adjusting screw 36 as shown in FIG. 7. Thus, if a minus tip of a driver is fit in the groove 36a and the screw 36 is turned to adjust the amount of projection of the screw 36, the inclination of the mirror 18 is adjusted to adjust the vertical inclination of the viewfinder optical axis as viewed in the Figure, with respect to the optical axis of the Cassegrainian type optical system. A rear cover 38 is detachably attached to the main body 28 and is removed therefrom at the time of the adjustment.

Additionally, with reference to FIG. 3, the mirror 18 may be rotated along with the light restricting sleeve 30 to adjust the alignment of the two optical axes in the direction perpendicular to the plane of the paper of the drawing. The adjustment will be explained in more detail with reference to FIG. 7. The flange 30b of the sleeve 30 is formed with a pair of slits 30c and 30d which are parallel with and diametrically opposite to each other. An aperture 30e is formed on the flange 30b at the position shown in the Figure. The sleeve 30 is supported on the main body 28 by means of screws 40 and 42 which extend through the slits 30c and 30d respectively and are threaded into the main body 28. The angular or rotational position of the sleeve 30 relative to the main body 28 may be adjusted by changing the amount of eccentricity or rotational position of a eccentric screw 44 which engages in the aperture 30e. Upon the adjustment, the two screws 40 and 42 are loosened and then the eccentric screw 44 may be turned to change the angular position of the sleeve 30 relative to the main body 28 so that the alignment of the measuring and viewfinder optical axis may be adjusted. As described above, the optical axis of the Cassegrainian type optical system and the optical axis of the viewfinder optical axis exactly align with each other after the adjustment in the vertical direction and in the direction normal to the plane of the paper of the drawing.

It should be understood that the size of the mirror 18 is determined such that the mirror 18 will not partially block the measuring light while the main mirror 14 and submirror 16 are shifted integrally along the optical axis for focusing.

Figure 1A:
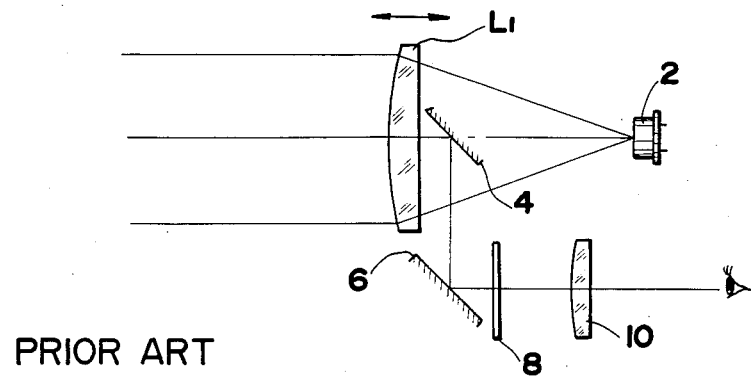
FIGS. 1(a) and (b) are cross sectional views showing the optical systems of the conventional radiation thermometer respectively.
Figure 1B:
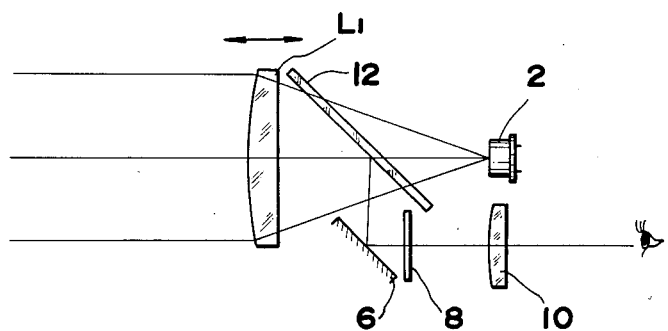
Figure 2A:
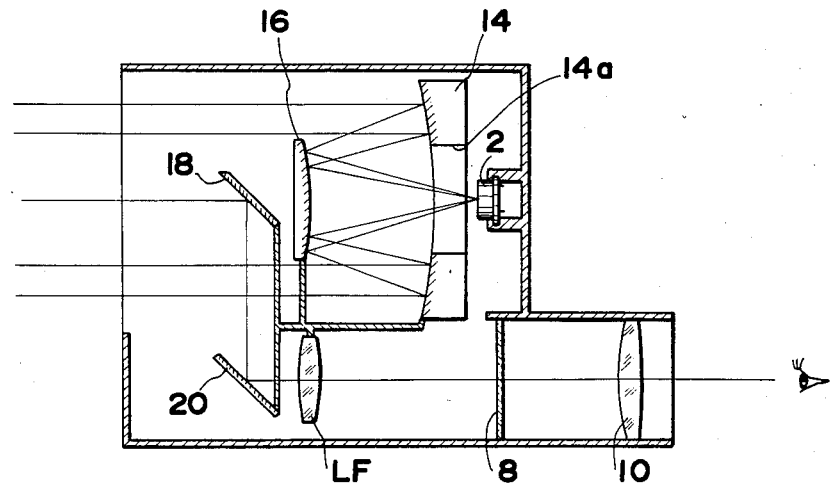
FIGS. 2(a) and (b) are cross sectional views showing respectively possible optical systems for a radiation thermometer employing the Cassegrainian type optical system.
Figure 2B:
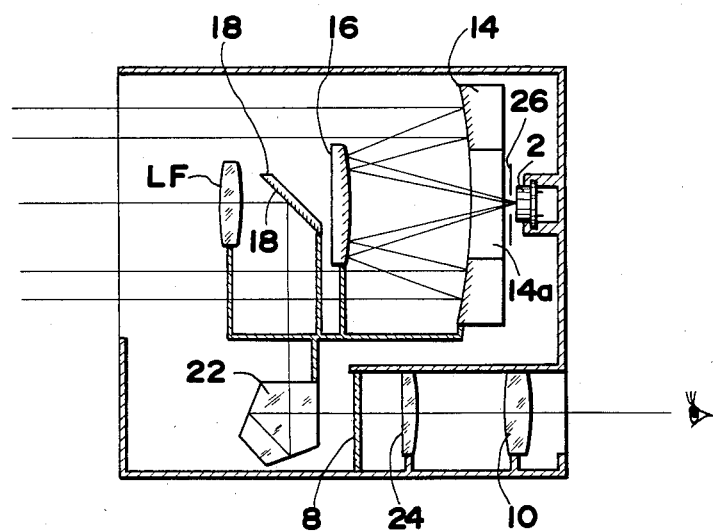

According to the embodiment as described above, the central portion of the submirror 16 of the Cassegrainian type optical system is used as the viewfinder lens and a mirror 18 is disposed in the space at just the rear of the submirror and about the optical axis such that the mirror 18 directs the paraxial light beam coming from a target object, to the outside of the measuring light path to utilize the directed light for the viewfinder. Thus, no optical element of the viewfinder is required to be disposed in front of the submirror 16. Further, although the submirror 16 must be composed of the pair of lenses cemented with each other in place of a single lens in the conventional optical system, the increase of the thickness of the submirror is extremely small and the entire length of the optical system of the embodiment is extremely small in comparison with the conventional system wherein a viewfinder mirror is disposed in front of the submirror 16 as shown in FIG. 2b. Thus, the optical system of the embodiment will be compact in size.

In the optical system of a radiation thermometer provide with the Cassegrainian type measuring optical system wherein the light from a target object to be measured is reflected by the main mirror and then by the submirror and is introduced to the photoelectric detector through the central aperture of the main mirror, the present invention is characterized in that the submirror is composed of a viewfinder lens which serves as a part of the viewfinder optical system and is formed with a light reflecting layer on the rearmost surface at the peripheral or off-center portion thereof, and that a mirror is disposed at the rear of and close to the submirror and about the optical axis to reflect the light beam passing through the central portion of the submirror to direct the light to a viewfinder optical system outside of the measuring light path. With this construction wherein the central portion of the submirror that was not used in the conventional system is used as the viewfinder lens, an additional viewfinder lens is dispensed with and the construction will be simple. Further, no viewfinder lens or mirror is required to be disposed in front of the submirror as was the case of conventional systems shown in FIG. 2b, but a mirror is disposed in the space at the rear of the submirror and about the optical axis which space was not utilized in the conventional system so that no additional space is required for the mirror, resulting in further compactness of the system. Additionally, as the submirror and the mirror are disposed closely to each other, it will not occur that the viewfinder image cannot be observed when the user slightly shifts the position of his eye relative to the eyepiece. As no lens is used in the measuring optical system, an inexpensive radiation thermometer that can measure the temperature to the extent of an ordinary temperature range, can be provided.

Still further, if the system of the invention is provided with a pinhole plate with a pinhole for restricting the width of light beam incident on the photoelectric detector, and is provided with means for adjusting the rotational position and inclination of the mirror for matching the measuring area determined by the pinhole with the area indicated by a indexing or indicating mark in the viewfinder field, the error during the assembly of the system will be eliminated.

What is claimed is:

1. An optical system of a radiation thermometer comprising:
   first means, having a reflective surface concave to the front side, for reflecting light coming from a target object to be measured;
   second means, located on the front side of said first reflecting means, for reflecting light which has been reflected on said first reflecting means, said second reflecting means including a lens system which has a rearmost surface convex to the rear side, said rearmost surface having a reflective portion on the periphery thereof and a transmitting portion on the center thereof;
   means for receiving light reflected from said first and second reflecting means to produce an electrical signal effective for determining the temperature of the target object;
   third means, adjustably fixed to and located between said first and second reflecting means along the optical axis thereof, for reflecting light which has passed through the lens system of said second reflecting means and through said transmitting portion of said rearmost surface thereof; and
   means for forming a finder image of said target object in conjunction with said lens system of said second reflecting means and with said lens system of said second reflecting means and with said third reflecting means by receiving the light reflected on said third reflecting means.

2. The invention of claim 1, further comprising means, located in front of said light receiving means, for interrupting light other than that reflected on both of said first and second reflecting means to be incident on said light receiving means, whereby light reflected on said second reflecting means and directed to a direction other than said light receiving means is interrupted by said interrupting means.

3. The invention of claim 2, wherein said light interrupting means includes a light shielding sleeve formed around said light receiving means, said light shielding sleeve being extended along the optical axis.

4. The invention of claim 1, further comprising means for restricting the width of a light bundle which would be received by said light receiving means.

5. The invention of claim 4, wherein said third reflecting means is determined in size and in location not to interrupt the light bundle restricted by said restricting means.

6. The invention of claim 4, wherein said restricting means includes a pinhole plate with a pinhole located in front of said light receiving means, whereby the light passed through said pinhole is received by said light receiving means.

7. The invention of claim 4, further comprising means for indicating in said finder image, an area to be measured, said area being determined in accordance with an image formed on said light receiving means.

8. The invention of claim 7, wherein said indicating means includes an indexing mark located in said finder image forming means.

9. An optical system of a radiation thermometer comprising:
a body;
a first means, having a reflective surface concave to the front side, for reflecting light coming from a target object, said first reflecting means being movable along the optical axis relative to said body;
a second means, located on the front side of said first reflecting means, for reflecting light which has been reflected on said first reflecting means, said second reflecting means including a lens system which has a rearmost surface convex to the rear side, said rearmost surface having a reflective portion on the periphery thereof and a transmissible portion on the center thereof, said second reflecting means movable along the optical axis relative to said body;
means for receiving light reflected on said first and second reflecting means to produce an electrical signal effective for determining the temperature of said target object, said light receiving means being fixed to said body;
a third means, located between said first and second reflecting means along the optical axis thereof, for reflecting light which has passed through said lens system of said second reflecting means and through said transmissible portion of said rearmost surface thereof, said third reflecting means being fixed to said body;
means for forming a finder image of said target object in conjunction with said lens system of said second reflecting means and with said third reflecting means by receiving light reflected on said third reflecting means, said finder image forming means being fixed to said body; and
means for shifting said first and second reflecting means along the optical axis relative to said body in order to focus the measuring optical system including said first and second reflecting means, and said finder image forming means.

10. The invention of claim 9, further comprising means for interrupting light other than that reflected on both of said first and second reflecting means to be incident on said light receiving means, said light interrupting means being fixed to said body, and said light receiving means being attached to in position within said light interrupting means.

11. The invention of claim 10, further comprising means for restricting a light bundle which would be received by said light receiving means, said restricting means being fixed to said light interrupting means.

12. The invention of claim 11, further comprising means for indicating in said finder image, an area to be measured, said area being determined in accordance with an image formed on said light receiving means.

13. The invention of claim 12, wherein said third reflecting means is fixed to said light interrupting means, and said optical system further comprising means for adjusting the rotational position and the inclination of said third reflecting means relative to said interrupting means in order that the area of said target object to be measured is precisely indicated in the finder image.

14. The invention of claim 9, wherein said first, second, and third reflecting means and said finder image forming means are designed such that compound focal length of said first reflective means and the reflective portion of said second reflective means is equal to focal length of the lens system of said second reflective means.

15. An improved optical sytem for a radiation thermometer to measure the temperature of a target object comprising:
a housing body;
a first means, having a reflective surface concave to the front side, for reflecting light coming from the target object, said first reflecting means being moveable along the optical axis relative to said housing body;
a second means, located on the front side of said first reflecting means, for reflecting light from the target object which has been reflected on said first reflecting means, said second reflecting means including a lens system which has a rearmost surface convex to the rear side, said rearmost surface having a reflective portion on the periphery thereof and a transmissible portion on the center thereof, said second reflecting means movable along the optical axis relative to said housing body;
means for receiving light reflected on said first and second reflecting means to produce an electrical signal effective for determining the temperature of said target object, said light receiving means being fixed to said housing body;
a third means, located between said first and second reflecting means along the optical axis thereof, for reflecting a portion of light which has passed through said lens system of said second reflecting means and through said transmissible portion of said rearmost surface thereof, said third reflecting means being movably fixed to said housing body;
means for forming a finder image of said target object in conjunction with said lens system of said second reflecting means and said third reflecting means by receiving light reflected on said third reflecting means, said finder image forming means being fixed to said housing body and including a pentagonal prism;
means for calibrating the finder image of movement of the third means; and
means for shifting said first and second reflecting means along the optical axis relative to said housing body in order to focus the measuring optical system.

16. The invention of claim 15 wherein the means for calibrating includes a ring member and the third means includes a cantilevered mirror position to extend in the center of the ring member and of a size to permit light to pass between an outer edge of the mirror and an inner edge of the ring member to impact the means for receiving.

* * * * *